No. 800,720. PATENTED OCT. 3, 1905.
J. M. CLOSSON.
TRUCK ATTACHMENT FOR SLEIGHS.
APPLICATION FILED OCT. 17, 1904.
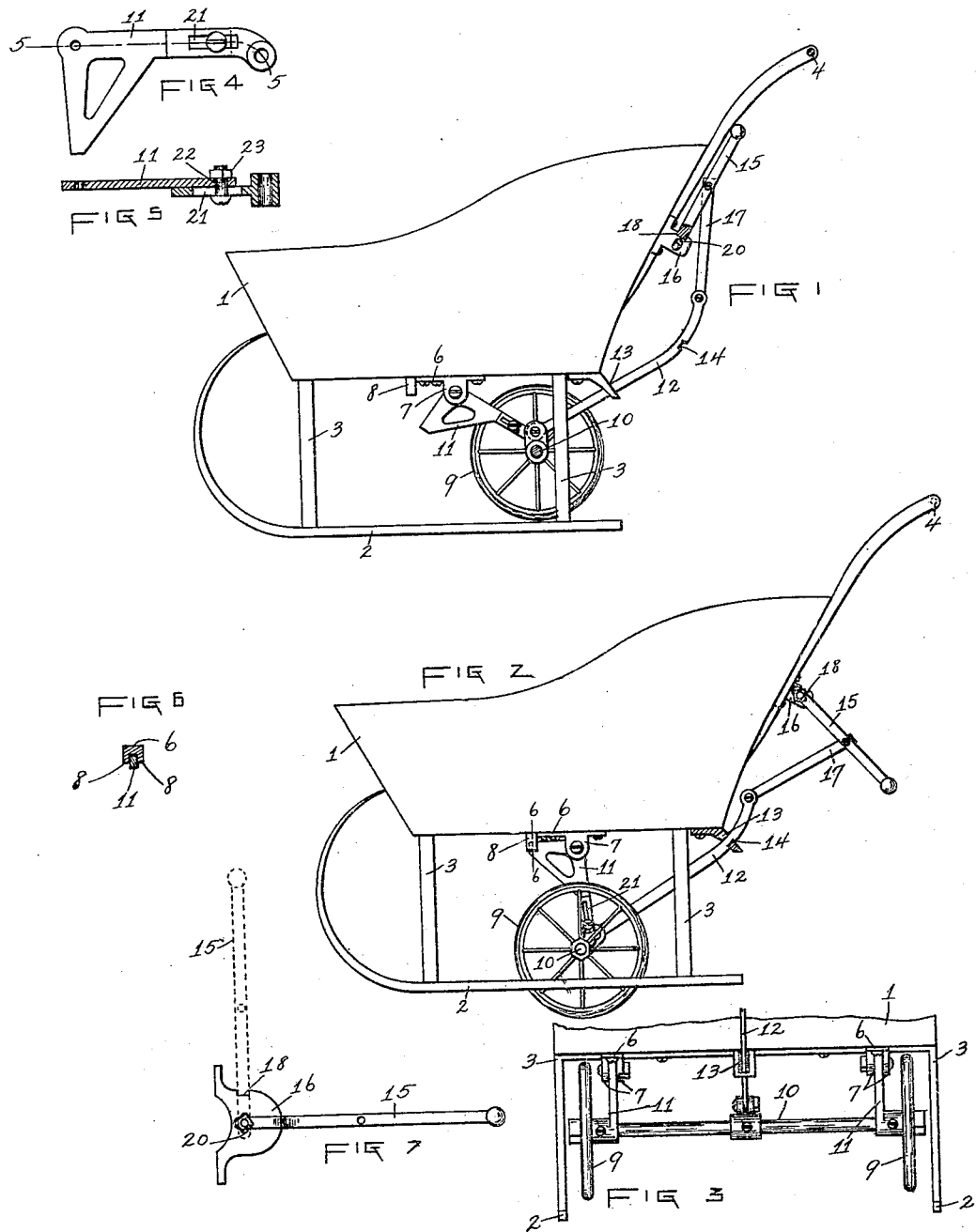

UNITED STATES PATENT OFFICE.

JOHN M. CLOSSON, OF HOOSICK FALLS, NEW YORK, ASSIGNOR OF ONE-HALF TO BERNARD McCUSKER, OF TROY, NEW YORK.

TRUCK ATTACHMENT FOR SLEIGHS.

No. 800,720.  Specification of Letters Patent.  Patented Oct. 3, 1905.

Application filed October 17, 1904. Serial No. 228,833.

*To all whom it may concern:*

Be it known that I, JOHN M. CLOSSON, a citizen of the United States, residing at Hoosick Falls, county of Rensselaer, and State of New York, have invented certain new and useful Improvements in Truck Attachments for Sleighs, of which the following is a specification.

The invention relates to such improvements; and it consists of the novel construction and combination of parts hereinafter described and subsequently claimed.

Reference may be had to the accompanying drawings, and the reference characters marked thereon, which form a part of this specification.

Similar characters refer to similar parts in the several figures.

Figure 1 of the drawings is a view in side elevation, partly in section, of a sleigh provided with my improved truck attachment, shown in an elevated position. Fig. 2 is a similar view with the attachment in a lowered position, adapted for supporting the sleigh upon the wheels of the truck. Fig. 3 is a view in rear elevation of the sleigh and attachment, as shown in Fig. 1, with the upper portion broken away. Fig. 4 is a side view, on an enlarged scale, of an adjustable bracket forming part of the truck-frame containing a bearing for the axle or shaft on which the wheels are mounted. Fig. 5 is a cross-section of the same taken on the broken line 5 5 in Fig. 4. Fig. 6 is a cross-section taken on the broken line 6 6 in Fig. 2, illustrating the manner in which the end of the truck-frame bracket is supported against lateral movement when the truck is lowered. Fig. 7 is a side view, on an enlarged scale, of the mechanism for raising and lowering the truck and for locking the same in a raised position.

My invention relates to truck attachments for sleighs and may be applied to sleighs of various kinds, being particularly adapted for use in connection with an ordinary childrens' box-sleigh.

The object of the invention is to provide for the temporary substitution of wheels for runners to support the vehicle to facilitate the passage of the vehicle over bare spots in the road or sidewalk or spots covered with ashes or other frictional substance.

Referring to the drawings, wherein the invention is shown in its preferred form, 1 represents the box or body of the sleigh, mounted upon runners 2 by means of the knees or braces 3 in the usual manner.

The sleigh may be propelled in any known manner, as by means of the push-handle 4.

Fixed upon the under side of the box or body by means of screws are a pair of hanger-plates 6, each having depending ears 7, provided with pivot-apertures and having forwardly thereof a pair of depending lugs 8.

The truck comprises a pair of wheels 9, mounted upon a shaft or axle 10, which is supported in bearings in a pair of brackets 11, each of which is pivotally connected with the pair of depending ears on one of said hanger-plates, said plates being so arranged that the pivotal connections are in axial line with each other transversely of the sleigh box or body. The brackets 11 are similar in construction and are in the general form of a bell-crank, and the forward end of each bracket is so formed that it is adapted when the truck is lowered to a position to cause its wheels to project below the plane of the runners to abut upon the under side of its supporting hanger-plate and to occupy a position between and supported by the pair of lugs 8 on said plate, as shown in Figs. 2 and 6. The construction described permits the truck to occupy either the raised position, (shown in Fig. 1,) in which the wheels are above the plane of the runners, or the lowered position, (shown in Fig. 2,) with the wheels below the plane of the runners adapted to support the vehicle, and when in the latter position it will be seen that the truck-frame is firmly braced against twisting movement by the engagement of the forward end of its angle-levers with the hanger-plate and the lugs 8 8 thereon. I have shown the shaft or axle of the truck connected with a link 12, which passes through a slideway 13, mounted upon the rear end of the sleigh-body, which link is provided with a notched portion 14, adapted to interlock with the outer wall of the slideway, as shown in Fig. 2, to further brace and support the truck-frame when lowered. The truck may be operated in any known manner. I have shown means for operating the truck comprising a hand-lever 15, pivoted in a bracket 16, fixed by means of screws upon the back of the sleigh-box and connected by link 17 with the upper end of link 12 in such a manner that by swinging movement of the lever 15 the truck-frame can be raised or lowered, as desired. The truck may be supported in raised position by the engagement of the lever 15 with the notched portion 18 of the bracket 16, the end of said lever connected with said bracket being slotted to receive the bracket 16, said bracket being provided with an elongated aperture 20 for the connecting-pivot adapted to permit such lost motion as may be necessary to seat the lever in and unseat it from the notched portion 18.

My invention is particularly adapted to form an attachment for sleighs of various kinds, the mounting of the attachment upon the sleigh being accomplished wholly by the use of screws.

To facilitate the use of my invention with sleighs of different heights, I prefer to make the brackets 11 adjustable in length, as by making the same in two parts capable of sliding adjustments one upon another, one of said parts being provided with a slot 21, adapted to receive the shank of a screw inserted therethrough into a screw-threaded aperture 22 in the other member and provided with a lock-nut 23. The adjustment of the bracket may be accomplished in any known manner.

I have shown two levers 11 and two wheels on my truck attachment; but I do not wish to be limited to a plurality of wheels or brackets.

What I claim as new, and desire to secure by Letters Patent, is—

1. The combination with the body and runners of a sleigh; of a truck-frame pivotally mounted upon the under side of the sleigh-body, comprising in part an angle-lever; a pair of lugs depending from the bottom of the sleigh-body adapted to receive therebetween one end of said angle-lever; and a wheel mounted upon the other end of said angle-lever.

2. The combination with the body and runners of a sleigh; of a hanger-plate attached to the bottom of the sleigh-body having a pair of ears and a pair of lugs depending therefrom; a truck-frame bracket in the form of an angle-lever pivotally connected with said ears, and having one end adapted to enter and fit between said lugs; and a wheel mounted upon the other end of said lever.

3. The combination with the body and runners of a sleigh; of a pair of hanger-plates attached to the bottom of the sleigh-body in line with each other transversely thereof, each having a pair of ears and a pair of lugs; a pair of truck-frame brackets each in the form of an angle-lever pivotally connected with the ears on one of said hanger-plates, and having one end adapted to enter and fit between said lugs thereon; a shaft or axle mounted in the other ends of said bracket-levers, and wheels mounted upon said shaft or axle.

In testimony whereof I have hereunto set my hand.

JOHN M. CLOSSON.

Witnesses:
 DENNIS HALL,
 WALTER P. HALL.